June 25, 1963

G. M. BOUTON ET AL 3,095,089

PRESS FOR TUBULAR EXTRUSION

Filed Jan. 26, 1955

INVENTORS: G.M. BOUTON
J.H. HEISS, JR.
BY
Edwin B. Cave
ATTORNEY

June 25, 1963

G. M. BOUTON ET AL 3,095,089

PRESS FOR TUBULAR EXTRUSION

Filed Jan. 26, 1955

INVENTORS: G.M. BOUTON
J.H. HEISS, JR.
BY
Edwin B. Cave
ATTORNEY

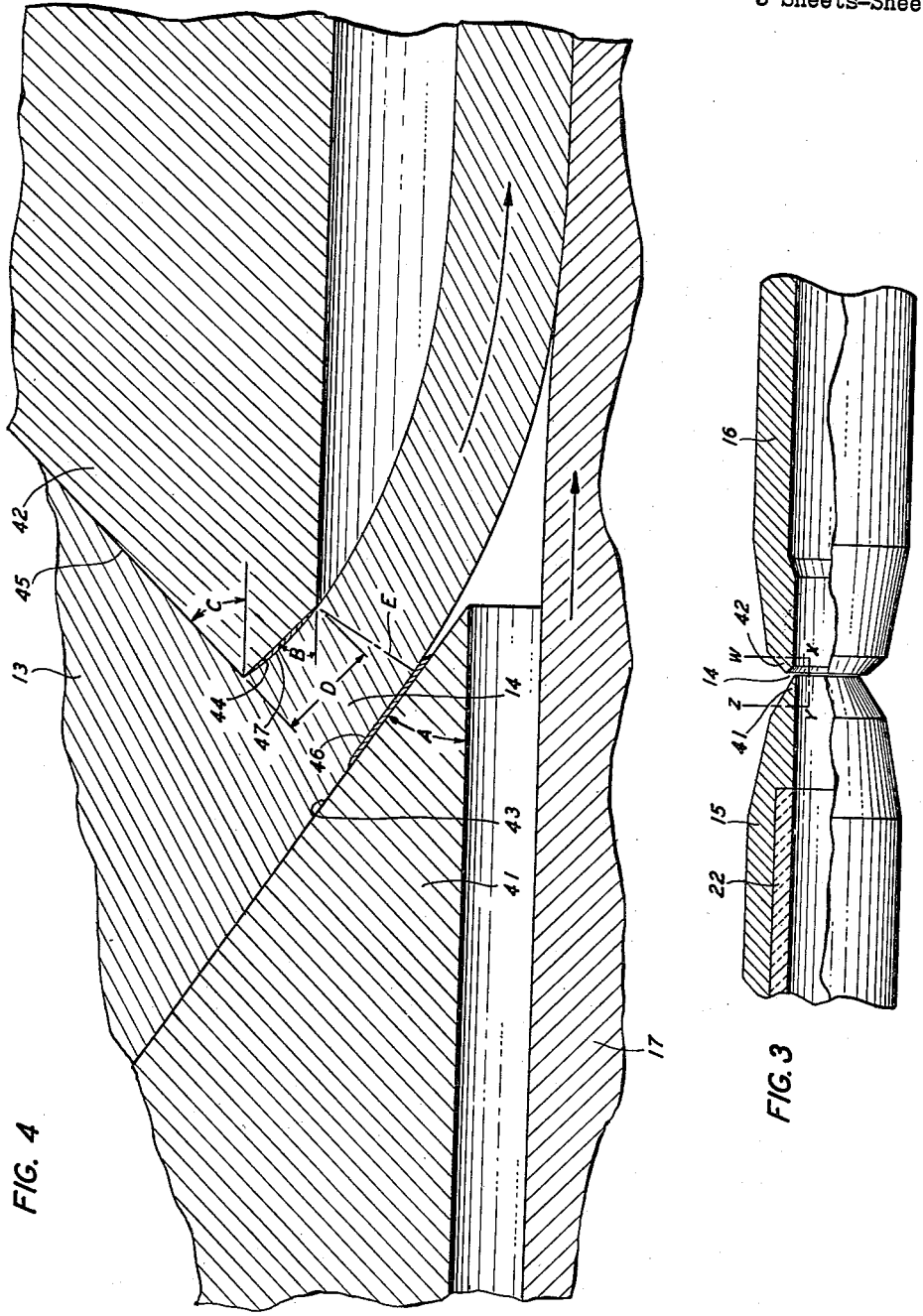

United States Patent Office 3,095,089
Patented June 25, 1963

3,095,089
PRESS FOR TUBULAR EXTRUSION
George M. Bouton, Madison, and John H. Heiss, Jr., Union, N.J., assignors to Bell Telephone Laboratories, Incorporated, New York, N.Y., a corporation of New York
Filed Jan. 26, 1955, Ser. No. 484,163
7 Claims. (Cl. 207—4)

This invention relates to extrusion presses. More particularly, the invention relates to presses adapted for the extrusion of solid material in long tubular form.

The extrusion of lead and lead alloys into tubular form as, for instance, in the manufacture of sheath for electrical cable has long been carried out in presses in which a charge of lead or lead alloy is forced through a die having a circular orifice. Due to the inherent plasticity of lead, it has been possible to carry out this extrusion at feasible temperatures and readily obtainable pressures.

Attempts to carry out similar extrusions with metals which are less plastic than lead, such as aluminum, have required the use of very much higher temperatures or pressures or both. This requirement of higher extrusion temperatures is particularly critical in the extrusion of sheath for electrical cable where restrictions on the maximum permissible temperature of extrusion, imposed by the necessity of avoiding damage to electrical insulation in the cable core, make it difficult to carry out extrusion at a feasible pressure.

The present invention provides a press structure and particularly an extrusion orifice configuration which renders feasible the extrusion of less plastic metals, such as aluminum, in tubular form at commercially usable pressures and at temperatures sufficiently low to permit the sheathing of electrical cable core. This structure is shown in the accompanying drawing in which:

FIG. 3 is a side elevation, partly in section, of the adjacent ends of the die and core tube used in the press of FIG. 1; and FIG. 4 is a diagrammatic representation of the metal extrusion taking place through the orifice defined by the die and core tube of FIG. 3, only that portion of the die and core tube falling within area WXYZ of FIG. 3 being shown.

Figure 1:
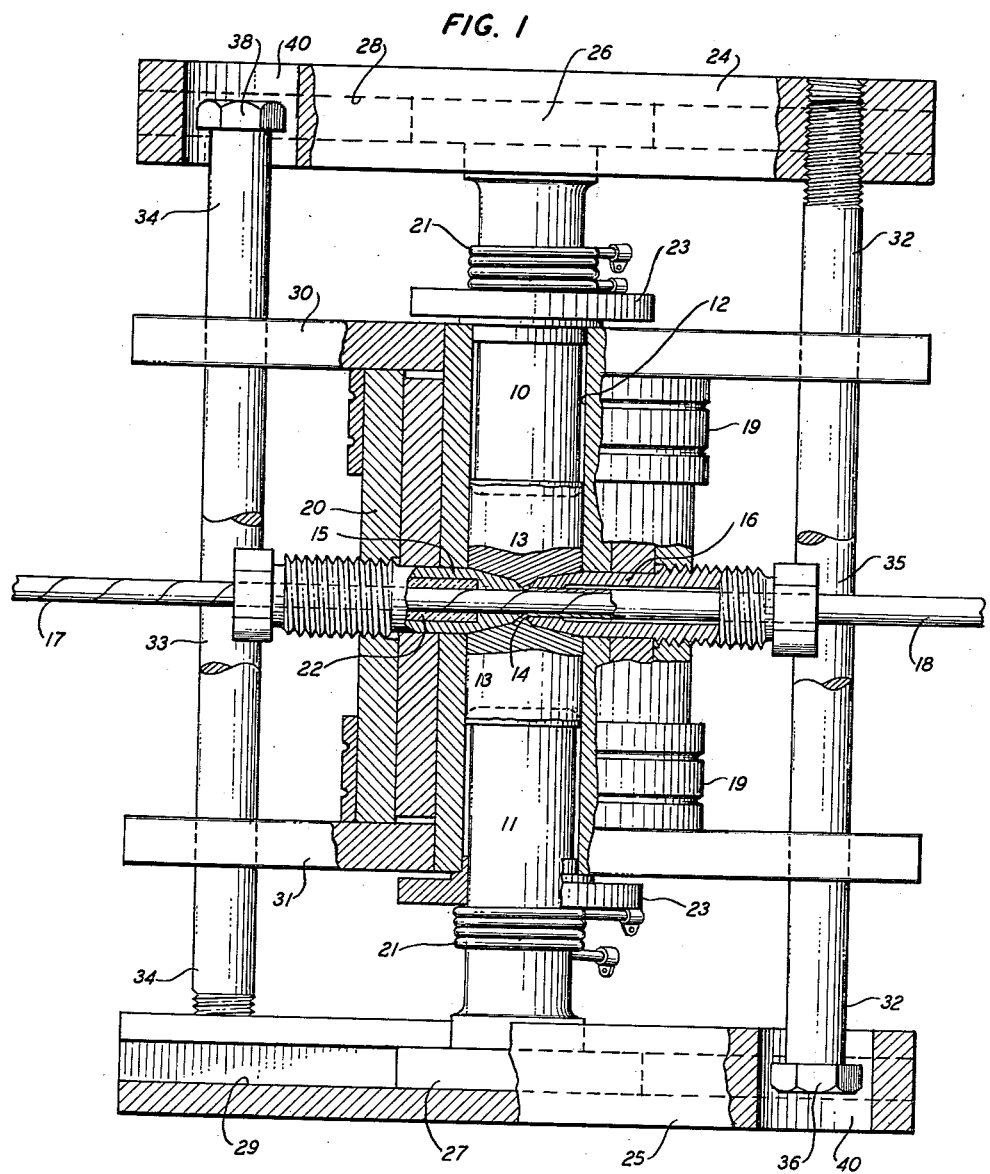
FIG. 1 is a side elevation, partly in section, of an extrusion press, embodying the present invention, the press being shown in extruding position.
Figure 2:
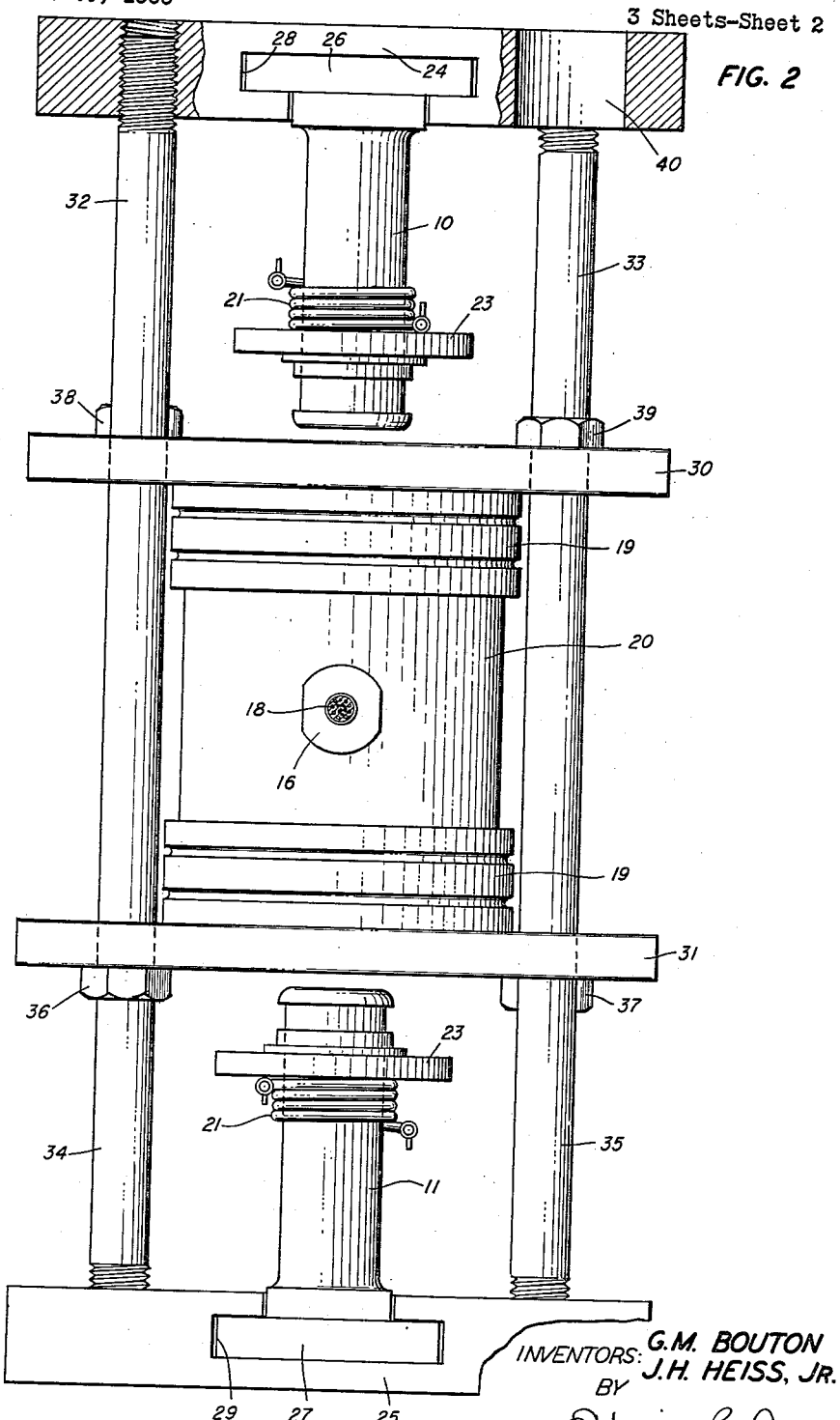
FIG. 2 is a front view of the press of FIG. 1, but with the plungers withdrawn from the extrusion cylinder.

The press of FIGS. 1 and 2 is of the opposing plunger type in which two cylindrical plungers 10, 11 are forced toward one another from opposite ends of a cylinder 12 and exert pressure on the charge 13 which is located within the cylinder between the plungers. Bushings 23 fitting within opposite ends of the cylinder surround each plunger in sliding relationship and serve to aid axial alignment of the plungers.

The charge is extruded in the form of a cylindrical tube through the orifice 14 defined by core tube 15 and die 16. The core tube and die, arranged along an axis perpendicular to the axis of cylinder 12, are so situated that the orifice 14 is located at substantially the center of cylinder 12 and midway between the faces of the plungers 10, 11.

Cable core 17 is fed through core tube 15 and becomes sheathed with the extruded metal as it passes orifice 14. The sheathed cable 18 is discharged through die 16. Core tube 15 is lined over the major portion of its length with a layer 22 of heat-resistant material of low heat conductivity, such as polytetrafluoroethylene to reduce heating of the cable core while it passes through the core tube.

The metal charge 13 is maintained at the required temperature for extrusion by means of electrical heaters 19 which surround the cylinder walls 20 which define cylinder 12. Additional sliding coil heaters 21 surround each piston so as to prevent excessive heat drain from the charge through the pistons.

Pressure is applied to plungers 10 and 11 through end plates 24 and 25 which support the slide members 26 and 27 forming the ends of the plungers. The members 26 and 27 are slidable horizontally within channels 28 and 29 in the end plates.

The cylinder walls 20 are mounted on cylinder end plates 30 and 31. The cylinder assembly, made up of cylinder end plates 30, 31, cylinder walls 20, heaters 19, core tube 15 and die 16, is not mounted in fixed position, but rides vertically on four rods, 32, 33, 34 and 35, assuming a position along these rods, in accordance with the relative vertical motion of the plungers 10, 11.

The rods 32, 33, 34, 35 are situated in positions corresponding to the corners of a rectangle. Rods 32 and 33 at diagonally opposite corners of the rectangle are mounted to upper end plate 24 by means of screw threads. Rods 34 and 35 situated at the other pair of diagonally opposed corners of the rectangle are similarly mounted on the lower end plate 25. All four rods pass through bearings in cylinder end plates 30, 31 of such size as to provide a sliding fit.

Each rod 32, 33, 34, 35 is provided with a head 36, 37, 38, 39 to restrict the distance which end plates 24 and 25 can be drawn apart. Holes 40 are provided in the necessary locations in end plates 24, 25, and permit the heads of the rods to pass through as the end plates are brought toward one another.

To begin operation of the press, end plates 24 and 25 are drawn apart until rod heads 36, 37, 38 and 39 are stopped by the corresponding cylinder end plate 30, 31. In this position, as shown in FIG. 2, plungers 10 and 11, as well as bushings 23 are fully withdrawn from cylinder 12. The plungers are then caused to slide back horizontally in channels 28 and 29 until they are no longer in line with the cylinder. A cylindrical billet of charge metal 13, slightly smaller than the diameter of the cylinder 12 and preheated to the proper temperature, is then inserted into each end of the cylinder. The plungers are then slid back into line with the cylinder and the end plates 24 and 25 are forced toward one another until the charge metal 13 begins to extrude through orifice 14 about the cable core as shown in FIG. 1.

During the extrusion the cylinder assembly is supported, in a vertical direction, only by the charge 13, and its vertical motion is controlled by the relative motion of opposing plungers 10 and 11. In this way, the force applied by the two plungers is kept balanced so that a uniform rate of extrusion is maintained on opposite sides of orifice 14 without the necessity of controlling the relative travel of the plungers as would be necessary if the cylinder assembly were in a vertically fixed position.

After the plungers have forced as much of the charge 13 through orifice 14 as is feasible, the plungers are withdrawn from the cylinder and new cylindrical billets of charge metal are inserted into the cylinders. The extrusion operation is then repeated. Successive billets weld with the preceding charge under the pressure applied by the plungers so that, upon extrusion, a continuous sheath is formed.

As stated above, it is necessary that the extrusion press be designed to permit extrusion at as low a pressure and temperature as possible. Positioning the extrusion orifice 14 at the axis of the cylinder 12 contributes to this result since the shear path of the metal to be extruded is less with the orifice in this position than with it located in any other position. The use of opposing plungers instead of a single plunger, also reduces the pressure required by eliminating the necessity for the metal to flow completely around the core tube. The pressure is kept as low as possible by using as high a ratio of bore to stroke in the cylinder 12 as is feasible. The use of a short stroke reduces the loss of pressure due to friction and/or shear between the charge and the cylinder walls or within the charge.

The design of the orifice 14 as shown in FIGS. 3 and 4 is also important in reducing the required pressure. Orifice 14 is defined by the tip 41 of core tube 15 and the tip 42 of die 16. The orifice configuration having optimum properties has been found to be one of relatively short length bounded by two coaxial, right, circular, conical surfaces, both forming angles with their axis which are acute toward the direction of the core tube. The two conical surfaces should form an angle with one another which lies between 5 degrees and 20 degrees and the inner conical surface should form an angle with its axis which lies between about 20 degrees and about 45 degrees. Orifice 14 is of such shape that each plane through the axis of the cylindrical bore of die 16 intersects the outer surface of mandrel tip 41 adjacent die 16 in a first straight line forming an angle approximately 20 degrees to 45 degrees with the axis of the die bore in the direction away from die 16. The planes also intersect the cylindrical portion of the die bore in a second straight line parallel to the axis of the die bore and intersect the surface of die tip 42 in third and fourth straight lines. The third straight line forms an angle with the axis of the die bore in the direction away from die 16 which is between about 5 degrees and about 20 degrees larger than the angle formed by the first straight line. The fourth straight line forms an angle with the axis of the die bore in the direction toward die 16 which is between about 30 degrees and about 60 degrees. Also of significance is the approach to the orifice as will be more apparent from the description below.

The structure of the orifice can be seen most clearly in FIG. 4 which represents a small portion of the section through the core tube and die which is bounded by the area WXYZ of FIG. 3. The conical surfaces which define the orifice 14 are the surface 43 of the core tube tip 41 and the surface 44 of the die tip 42. Surface 43 is the surface of a frustrum of a right, circular cone, the smaller diameter of which coincides with the diameter of the bore of the core tube and which has an axis coinciding with the axis of the bore of the core tube and the bore of the die. It has been found necessary for the angle A between the surface 43 and the bore of the core tube, which is the same as the angle between the surface 43 and the axis of the conical frustrum, to lie between about 20 degrees and about 45 degrees. Preferably, an angle of between 30 degrees and 40 degrees, and more preferably an angle of 35 degrees is used.

The surface 44 is also the surface of a right, circular conical frustrum, the smaller diameter of which coincides with the diameter of the bore of the die at the end adjacent to the core tube and which has an axis coinciding with the axis of the bore of the core tube and the bore of the die. The angle B between the surface 44 and the bore of the die, which is the same as the angle between surface 44 and the axis of the conical frustrum, should be between about 5 degrees and about 20 degrees larger than the angle A so that the orifice 14 converges in the direction of extrusion with an angle between 5 degrees and 20 degrees. Preferably, this difference between angles A and B should lie between 5 degrees and 15 degrees, with an optimum value of about 10 degrees. When angle A is 35 degrees, angle B preferably has a value of 45 degrees.

In order to reduce the pressure required for extrusion, it is necessary that the surface 44 terminate at the entrance to orifice 14 in a sharp angle. In FIG. 4 the surface 44 terminates by intersection with a third conical surface 45 coaxial with surfaces 43 and 44. This surface is the surface of a right, circular, conical frustrum, the smaller base of which coincides with the larger base of the conical frustrum which defines surface 44. The angle C between the surface 45 and its axis should be between about 30 degrees and about 60 degrees and preferably has a value of 45 degrees.

The distance D, which represents the length of the line formed by the intersection of an axial plane with the surface 44, should have the smallest value which is consistent with the extrusion of a smooth circular tube or sheath. As the length of the distance D is increased, the pressure required for extrusion increases. However, if this distance becomes too small, the resistance to extrusion within the orifice 14 becomes so small that there is an unbalance between the rate of extrusion at the points opposite the plungers and the points elsewhere around the circumference of the orifice. When this situation exists, extrusion takes place more rapidly at the points of the orifice closest to the plungers and less rapidly at the points 90 degrees removed around the circumference of the orifice. This unbalance results in the extrusion of an irregular, unround sheath. Particularly in extruding aluminum at temperatures of the order of 250° C. to 450° C., it has been found desirable for the distance D to have a length between about 5 mils and about 50 mils, preferably between about 10 mils and about 30 mils, and more preferably of the order of 20 mils.

The thickness of the sheath formed by extrusion is controlled by the distance between the surfaces 43 and 44. The distance between surfaces 43 and 44 can be controlled most simply by varying the axial distance between the tip of the core tube and the tip of the die. The tip of the core tube may penetrate within the opening of the die or may be completely outside the die opening. The distance between surfaces 43 and 44 can also be varied by varying the relative diameters of the core tube and the die.

The inside and outside diameters of the extruded sheath can also be controlled by varying the diameters of the die and core tube. The inside diameter and to a limited extent the outside diameter can be changed by varying the axial distance between the tips of the die and the core tube. In any event, in order to obtain a smooth extruded sheath, the tip of the core tube should never be removed so far from the tip of the die that the nearest edge of the core tube is not hit by the imaginery line E which is drawn perpendicular to the surface 43 from the line formed by the intersection of surface 44 with the bore of the die. It is preferable that the surface 43 have a length of at least one-quarter of an inch as measured from the tip along a line formed by the intersection of an axial plane with the surface. Obviously, where it is desired to extrude a hollow tube containing no cable core, a solid mandrel may be used in place of the hollow mandrel which constitutes core tube 15.

During the extrusion of the charge through the orifice 14, the metal being extruded appears to wet the surfaces 43 and 44. When this wetting occurs, there is apparently a thin film of aluminum formed on these surfaces so that the metal being extruded slides over these films by an internal shear action instead of sliding directly over the material from which the surfaces are formed. These adherent films of aluminum are shown diagrammatically in FIG. 4 as films 46 and 47. This extrusion with internal shear appears to require a lower pressure than would be required where friction existed between the extruded metal and the bare surfaces of the orifice. Thus, when extrusion is first begun, the first few lengths of sheath produced by a clean die and core tube are usually not as smooth as succeeding lengths which are extruded after the aluminum has had a chance to wet the surfaces of the orifice, and the first charge requires somewhat higher pressures for an equivalent extrusion speed than do subsequent charges.

It has been found advantageous to coat the die and core tube with a heat polymerized and at least partially carbonized coating of oil prior to their use in the press. This coating may be produced by dipping the tips of the die and core tube in a mineral oil and then heating them in air to a temperature in the vicinity of 350° C. by radiant heat. Mineral oils used successfully for this purpose have had flash points of at least 350° C. A particularly suitable oil is the lubricating oil known as "Gulf Supreme Oil E." This procedure produces a very adherent, hard, black, glossy finish which is retained during the operation of the press and reduces the friction of the metal charge against the die and core tube. The material of which this coating consists is essentially carbon.

In order to assure the proper welding of the billets to the preceding charge, it is necessary that they be maintained free from contamination. Aluminum billets are conveniently prepared by casting the aluminum in the form of a long cylindrical bar having a diameter substantially greater than the diameter of the press cylinder. This bar may be cut into the proper lengths and the outer surface of each of these lengths may be sheared off to produce the cylindrical billet of the proper diameter. In this manner, surface metal which may be unsound is eliminated from the billet. The billets are preferably degreased in a volatile solvent before use.

When the billets are used in this manner without further preparation, there is a possibility for air to become entrapped within the charge and to form pinholes in the extruded sheath. This entrapment of air tends to occur because of the fact that the application of pressure by the plunger to the billet causes it to bulge at the middle of its length and to assume a barrel shape, thus entrapping air around the circumference of the billet between the portion which has bulged and the preceding charge.

This entrapment of air can be avoided by the use of one of two expedients or preferably both. Before the billet is charged into the cylinder, a number of small grooves for instance in the form of a V-shape 10 mils wide and 10 mils deep, can be cut along the length of the billet. It has been found that these grooves are retained for a sufficient time after the application of pressure to the billet in the press to permit entrapped air to travel along them and to escape. The second expedient for avoiding entrapment of air consists of charging the billet into the press at a temperature somewhat below the temperature of the charge already in the press. For aluminum, a temperature differential in the vicinity of 100° C. will be found effective to achieve the desired result. After the billet is charged, pressure is applied to the billet before it has been raised to the temperature of the residual charge in the press. The heat flow from the residual charge to the lower temperature billet causes a temperature gradient within the billet which runs from the high temperature end in contact with the residual charge to the lower temperature end in contact with the plunger. Since the material at the higher temperature has the greater plasticity, the pressure applied by the plunger causes the billet to assume the shape of a truncated cone with its larger base at the end in contact with the residual charge. Thereafter the billet fills up the clearance space between itself and the cylinder wall by spreading progressively outward toward the plunger. This action avoids entrapment of air due to the barreling of the billet mentioned above.

In a typical operation of the press of the present invention, a core tube was employed in which the bore was .49 inch in diameter and in which the angle A had a value of 35 degrees. A die was used which had a bore of .57 inch and in which the angle B had a value of 45 degrees and the angle C had a value of 45 degrees. The distance D on the die had a value of .020 inch. Operating with a charge of aluminum having a purity of 99.99 percent in the form of billets 2.2 inches in diameter and 3.5 inches in length, and extruding a sheath at a temperature of 337° C. over a paper-covered cable core at a rate of 25 feet per minute, it was found necessary to apply a pressure of 67,000 pounds per square inch at the beginning of the stroke. By the end of the stroke, the pressure required had been reduced to 56,000 pounds per square inch. Under the same conditions, except that the temperature was maintained at 440° C., the applied pressure at the beginning of the stroke was 40,000 pounds per square inch and at the end of the stroke was 37,000 pounds per square inch. When the temperature was lowered to 284° C., the initial pressure was 87,000 pounds per square inch and the final pressure was 68,000 pounds per square inch.

With aluminum of somewhat higher impurity content, it was found necessary to use somewhat higher pressures. Thus at 360° C., using an aluminum of 99.0 percent purity, an initial pressure of 83,000 pounds per square inch and a final pressure of 66,000 pounds per square inch were required. Using aluminum of the same purity at a temperature of 330° C. an initial pressure of 100,000 pounds per square inch and a final pressure of 76,000 pounds per square inch were required.

With an aluminum of intermediate purity (99.9 percent) at a temperature of 330° C., an initial pressure of about 84,000 pounds per square inch and a final pressure of about 67,000 pounds per square inch were required.

The effect of the die and core tube configuration of the present invention can be seen by a comparison with the extrusion obtained using a similar core tube and a die which was similar except that the surfaces corresponding to surfaces 44 and 45 each had a rounded section instead of a straight line section. Using aluminum of a purity of 99.99 percent, a temperature of 335° C. and a constant pressure of 65,000 pounds per square inch, it was found that when the plungers had traveled 80 percent of their stroke, the extrusion rate with the die and core tube of the present invention was about 1000 inches per minute, whereas the extrusion rate with the other die described above was only about 100 inches per minute.

The press described above has embodied a cylinder assembly which is not fixed with respect to vertical travel. It is apparent that the benefits of the present invention will be obtained with other types of presses, whether or not they embody fixed cylinder assemblies.

Although the invention has been described in terms of its specific embodiments, it is to be understood that this description is illustrative only and is not necessarily to be considered a limitation upon the scope of the invention.

What is claimed is:

1. A press for extruding a metal covering on an electrical cable core comprising a chamber for containing metal to be extruded, a coacting extrusion die and core tube situated within said chamber, said die and core tube each having an inner bore, said die and core tube inner bores being centered about coincident axes, the bore of said die being larger than the bore of said core tube, the outer surface of the portion of said core tube adjacent to said die being in the form of a first right, circular, conical frustrum having its axis coincident with the axis of the bore of said core tube and having the edge of its smaller diameter base coincident with that end of the bore of said core tube which is adjacent to said die, said outer surface forming an angle of between 20 degrees and 45 degrees with its axis, the end of the die adjacent to said core tube having an opening constituting an enlargement of the bore of said die, said opening being in the form of a second right, circular, conical frustrum having its axis on the same line as the bore and having the edge of its smaller diameter base coincident with the edge of said die bore, the surface of said second conical frustrum forming an angle with the axis of said second conical frustrum which is between 5 degrees and 10 degrees larger than the angle formed by the surface of said first conical frustrum, the outer surface of the portion of said die adjacent to said core tube being in the form of a third right, circular, conical frustrum having its axis coincident with the axis of the die bore and having the edge of its smaller diameter base coincident with the edge of the larger diameter base of said second conical frustrum the surface of said third conical frustrum forming an angle of between 30 and 60 degrees with the axis of said third conical frustrum, the length of said second conical frustrum along its conical surface from its larger base to its smaller base being between about 5 mils and about 50 mils.

2. A press for extruding an aluminum covering on an electrical cable core comprising a cylinder for containing the aluminum to be extruded, a pair of opposing plungers axially slidable within said cylinder, a coacting extrusion die and core tube defining an orifice situated along the axis of said cylinder and between said plungers, said die and core tube each having an inner bore, said die and core tube inner bores being centered about coincident axes which are perpendicular to the axis of said cylinder, the bore of said die being greater than that of said core tube, the outer surface of the tip of said core tube adjacent to said die constituting the inner wall of said orifice and being in the form of a first right, circular, conical frustrum having its axis coincident with the axis of the bore of said core tube and having the edge of its smaller diameter base coincident with that end of the bore of said core tube which is adjacent to said die, said outer surface forming an angle of about 35 degrees with its axis, the end of the die adjacent to said core tube having an opening constituting an enlargement of the bore of said die, said opening being in the form of a second right, circular, conical frustrum having its axis on the same line as said die bore and having the edge of its smaller diameter base coincident with the end of said die bore, the surface of said second conical frustrum constituting the outer wall of said orifice and forming an angle of about 45 degrees with the axis of said second conical frustrum, the outer surface of the tip of said die adjacent to said core tube being in the form of a third right, circular, conical frustrum having its axis coincident with the axis of said die bore and having the edge of its smaller diameter base coincident with the edge of the larger diameter base of said second conical frustrum, the surface of said third conical frustrum forming an angle of about 45 degrees with its axis, the length of said second conical frustrum along its conical surface from its larger base to its smaller base being about 20 mils.

3. An extrusion press comprising a cylinder for containing the charge to be extruded, a pair of opposing plungers axially slidable within said cylinder, a mandrel having a tip which has a conical exterior surface and a hollow die having a conical exterior surface at its tip and having a bore which has a cylindrical portion near but not at its tip and a conical portion which increases in diameter from said cylindrical portion to the tip of the die, both said mandrel and said die being mounted within said cylinder so that the conical exterior surface of the mandrel and the conical portion of the die bore define an orifice situated at the center of said cylinder and midway between said plungers, said orifice being of such shape that each plane through the axis of said bore intersects the outer surface of the tip of said mandrel adjacent said die in a first straight line forming a first angle with said axis when extended, which angle has its vertex pointing toward the die and lies between about 20 degrees and about 45 degrees, each plane through said axis also intersects said cylindrical portion of the bore of said die in a second straight line parallel to said axis, intersects the conical portion of the bore of said die in a third straight line and intersects the conical exterior surface of the die tip in a fourth straight line, said third straight line forming a second angle with said axis, when extended, which is acute in the same direction as said first angle and is between about 5 degrees and about 20 degrees larger than said first angle, said third straight line intersecting said second straight line and said fourth straight line and having a length between its intersection with said second straight line and its intersection with said fourth straight line of between 5 mils and 50 mils, said fourth straight line forming a third angle with said axis when extended, which third angle is acute in the opposite direction to said first and second angles and lies between about 30 degrees and about 60 degrees.

4. The press defined in claim 3 wherein the length of the third straight line, between its intersection with the second straight line and its intersection with the fourth straight line, is between about 10 mils and about 30 mils.

5. The press defined in claim 4 wherein the first angle lies between 30 degrees and 40 degrees and the second angle is between 5 degrees and 15 degrees larger than the first angle.

6. The press defined in claim 1 wherein the length of the second conical frustrum is between about 10 mils and about 30 mils.

7. The press defined in claim 1 wherein the surface of the first conical frustrum forms an angle of between 30 degrees and 40 degrees with its axis, and the length of the second conical frustrum is between about 10 mils and about 30 mils.

References Cited in the file of this patent

UNITED STATES PATENTS

| | | |
|---|---|---|
| 79,896 | Bishop et al. | June 14, 1868 |
| 327,835 | Tatham | Oct. 6, 1885 |
| 408,374 | Cobb | Aug. 6, 1889 |
| 1,049,641 | Astfalck | Jan. 7, 1913 |
| 1,567,431 | Elrod | Dec. 29, 1925 |
| 2,038,215 | Gillis | Apr. 21, 1936 |
| 2,074,856 | Piercy | Mar. 23, 1937 |
| 2,241,543 | Dietz | May 13, 1941 |
| 2,335,590 | Gersman | Nov. 30, 1943 |
| 2,356,367 | Wright | Aug. 22, 1944 |
| 2,539,564 | Barrett | Jan. 30, 1951 |
| 2,639,809 | Perry et al. | May 26, 1953 |
| 2,651,411 | Bennett | Sept. 8, 1953 |
| 2,671,559 | Rosenkranz | Mar. 9, 1954 |
| 2,673,645 | Moczik | Mar. 30, 1954 |
| 2,731,144 | Dreyer | Jan. 17, 1956 |
| 2,750,034 | Gersman | June 12, 1956 |
| 2,782,921 | Norman | Feb. 26, 1957 |
| 2,832,468 | Krause | Apr. 29, 1958 |

OTHER REFERENCES

Elementary Mechanics of Fluids, by Hunter Rouse, John Wiley and Sons, Inc., New York, © 1946 pp. 23–27.